US012519915B2

(12) United States Patent
Porubanova et al.

(10) Patent No.: US 12,519,915 B2
(45) Date of Patent: Jan. 6, 2026

(54) RENDER CAMERA SEPARATION ADJUSTMENT

(71) Applicant: Microsoft Technology Licensing, LLC, Redmond, WA (US)

(72) Inventors: Michaela Porubanova, Seattle, WA (US); Gregory Michael Link, Charlotte, NC (US); Simon Labbe, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 95 days.

(21) Appl. No.: 18/233,078

(22) Filed: Aug. 11, 2023

(65) Prior Publication Data

US 2025/0055966 A1 Feb. 13, 2025

(51) Int. Cl.
*H04N 13/128* (2018.01)
*H04N 13/344* (2018.01)

(52) U.S. Cl.
CPC ......... *H04N 13/128* (2018.05); *H04N 13/344* (2018.05)

(58) Field of Classification Search
CPC ............................ H04N 13/128; H04N 13/344
See application file for complete search history.

(56) References Cited

U.S. PATENT DOCUMENTS

| | | | | |
|---|---|---|---|---|
| 10,536,624 B2 * | 1/2020 | Koizumi | ............. | H04N 23/959 |
| 10,798,285 B2 * | 10/2020 | Yasutomi | ............. | H04N 23/743 |
| 12,100,122 B2 * | 9/2024 | Sato | ............ | G06T 5/94 |
| 2012/0306860 A1 * | 12/2012 | Hatta | .................... | H04N 13/366 |
| | | | | 345/419 |
| 2013/0120362 A1 | 5/2013 | Harris | | |
| 2018/0288397 A1 * | 10/2018 | Lee | ........................ | H04N 13/204 |
| 2018/0338090 A1 * | 11/2018 | Iida | ............. | G06T 7/73 |
| 2019/0121428 A1 * | 4/2019 | Chen | ........................ | G06F 3/011 |
| 2019/0188432 A1 * | 6/2019 | Lozano | .............. | G06K 7/10801 |
| 2019/0260981 A1 | 8/2019 | Ollila | | |
| 2019/0310705 A1 * | 10/2019 | Hincapie Ramos | . | H04N 13/332 |
| 2020/0391077 A1 * | 12/2020 | Forsgren | ................. | G01S 13/88 |
| 2021/0137653 A1 * | 5/2021 | Saphier | .................... | G06T 19/20 |
| 2024/0241379 A1 * | 7/2024 | D'Amone | .............. | G02F 1/163 |
| 2024/0312376 A1 * | 9/2024 | Vlaskamp | .............. | G09G 3/001 |

FOREIGN PATENT DOCUMENTS

TW 202448174 A * 12/2024

OTHER PUBLICATIONS

Chiu, Yi-Jung translated of TW 202448174 A May 25, 2023 (Year: 2023).*
International Search Report and Written Opinion received for PCT Application No. PCT/US2024/037947, Oct. 23, 2024, 17 pages.

* cited by examiner

*Primary Examiner* — Zaihan Jiang
(74) *Attorney, Agent, or Firm* — Workman Nydegger

(57) ABSTRACT

Techniques for adjusting a separation distance between stimuli generated by a pair of rendering cameras to accommodate an IPD of a user who is viewing the stimuli are disclosed. The IPD of the user is determined. A first stimulus, which is generated by a first one of the rendering cameras, is accessed. A second stimulus, which is generated by a second one of the rendering cameras, is accessed. The separation distance between the first stimulus and the second stimulus is determined. The separation distance is then reduced, resulting in the separation distance being narrower than the user's IPD. The first and second stimuli are then displayed in accordance with the reduced separation distance.

17 Claims, 13 Drawing Sheets

RENDER CAMERA SEPARATION ADJUSTMENT

BACKGROUND

The phrase "extended reality" (ER) is an umbrella term that collectively describes various types of immersive platforms. Such immersive platforms include virtual reality (VR) platforms, mixed reality (MR) platforms, and augmented reality (AR) platforms.

For reference, conventional VR systems create completely immersive experiences by restricting their users' views to only virtual environments. This is often achieved through the use of a head mounted device (HMD) that completely blocks any view of the real world. With this HMD, a user can be entirely or partially immersed within an immersive environment. Conventional AR systems create an augmented reality experience by visually presenting virtual objects that are placed in the real world. Conventional MR systems also create an augmented reality experience by visually presenting virtual objects that are placed in the real world. In the context of an MR system, those virtual objects are typically able to be interacted with by the user, and those virtual objects can interact with real world objects. AR and MR platforms can also be implemented using an HMD.

Unless stated otherwise, the descriptions herein apply equally to all types of ER systems, which include MR systems, VR systems, AR systems, and/or any other similar system capable of displaying virtual content. An ER system can be used to display various types of information to a user. Some of that information is displayed in the form of a "hologram." As used herein, the term "hologram" (aka "stimulus") generally refers to virtual image content that is displayed by an ER system. In some instances, the hologram can have the appearance of being a three-dimensional (3D) object while in other instances the hologram can have the appearance of being a two-dimensional (2D) object.

Often, holograms are displayed in a manner as if they are a part of the actual physical world. For instance, a hologram of a flower vase might be displayed on a real-world table. In this scenario, the hologram can be considered as being "locked" or "anchored" to the real world. Such a hologram can be referred to as a "world-locked" hologram or a "spatially-locked" hologram that is spatially anchored to the real world. Regardless of the user's movements, a world-locked hologram will be displayed as if it was anchored or associated with the real-world. Other holograms can be locked to a particular position in the user's field of view (FOV).

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some aspects, the techniques described herein relate to a computer system that adjusts a separation distance between images generated by a pair of rendering cameras to accommodate an interpupillary distance (IPD) of a user who is viewing the images, said computer system including: a processor system; and a storage system that stores instructions that are executable by the processor system to cause the computer system to: determine the IPD of the user; access a first image generated by a first one of the rendering cameras; access a second image generated by a second one of the rendering cameras; determine the separation distance between the first image and the second image, wherein the separation distance initially corresponds with the user's IPD; reduce the separation distance between the first image and the second image, resulting in the separation distance being narrower than the user's IPD; and display the first image and the second image in accordance with the reduced separation distance.

In some aspects, the techniques described herein relate to a method for adjusting a render camera separation between stimuli generated by a pair of rendering cameras to accommodate an interpupillary distance (IPD) of a user who is viewing the stimuli, said method including: determining the IPD of the user; accessing a first stimulus generated by a first one of the rendering cameras; accessing a second stimulus generated by a second one of the rendering cameras; determining the render camera separation between the first stimulus and the second stimulus, wherein the render camera separation initially corresponds with the user's IPD; reducing the render camera separation between the first stimulus and the second stimulus, resulting in the render camera separation being narrower than the user's IPD; and displaying the first stimulus and the second stimulus in accordance with the reduced render camera separation.

In some aspects, the techniques described herein relate to a method for adjusting an original horizontal position of an image that is rendered in a display of a head-mounted device (HMD) to accommodate an interpupillary distance (IPD) of a user who is viewing the image and who is wearing the HMD, said method including: determining the IPD of the user; accessing the image, which his generated by a rendering camera of the HMD; determining the original horizontal position of the image, wherein the original horizontal position initially corresponds with the user's IPD; selecting a new horizontal position for the image, the new horizontal position being relatively closer to a central area of the HMD as compared to the original horizontal position; and displaying the image in accordance with the new horizontal position.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
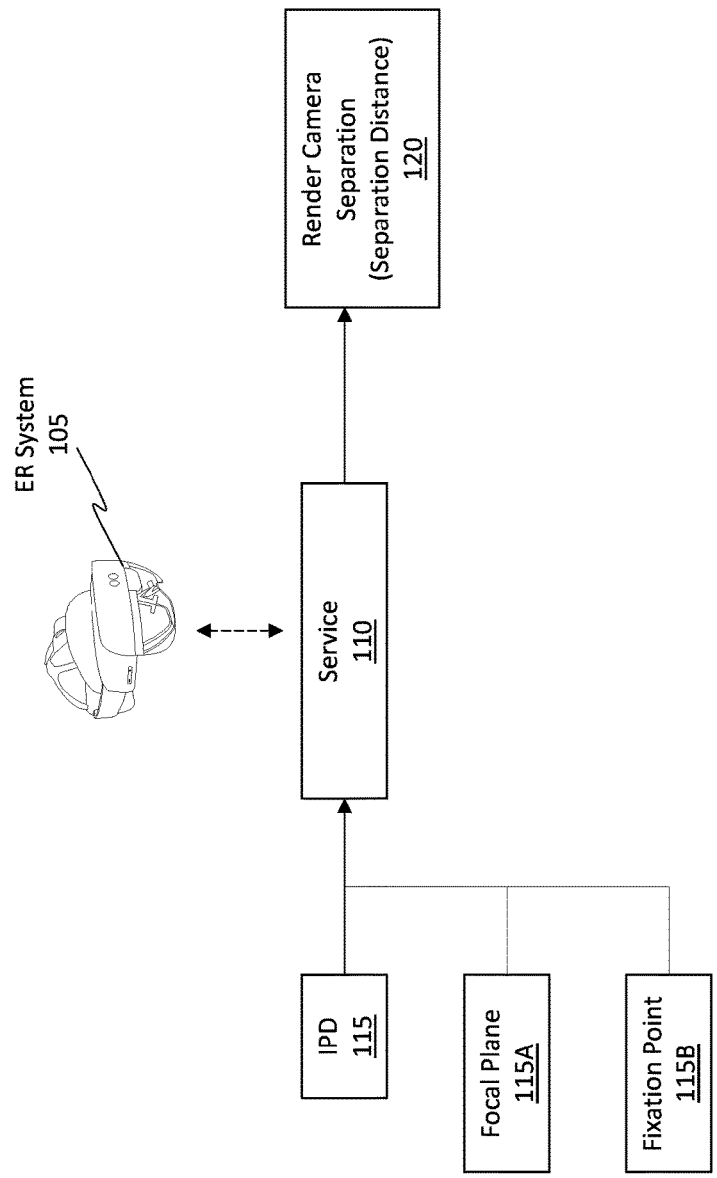
FIG. 1 illustrates an example architecture that can adjust a render camera separation.

As mentioned previously, HMDs are capable of displaying holograms (aka "stimuli"). A user can view and interact with these holograms while wearing the HMD.

Often, an HMD will include a lefthand display, which is viewed by the user's left eye, and a righthand display, which is viewed by the user's right eye. In some cases, the lefthand and righthand displays are separate display units. In other cases, the lefthand and righthand displays are part of the same display unit, and the display unit displays content at specific locations to be seen by the user's eyes.

To provide the illusion of depth for a stimulus, the HMD will display one version of a stimulus at a particular horizontal coordinate in the HMD's lefthand display. Another version of the stimulus will be displayed at a different horizontal coordinate in the HMD's righthand display. The disparity or offset in the horizontal pixel locations of the stimulus results in a perception of depth for the stimulus when the user's mind fuses the two display images together. The distance between the stimulus as presented in the lefthand display and as presented in the righthand display is referred to herein as the "render camera separation."

"IPD," or interpupillary distance, refers to the distance between a user's pupils. For an adult, the average IPD ranges between about 54 millimeters (mm) to about 68 mm.

IPD is often used as an input when rendering content with an HMD. For example, IPD provides information for determining how far apart the HMD is to render content in its lefthand display and its righthand display. If the IPD is not correctly matched, user comfort as well as user performance are negatively impacted. Particularly problematic is the case where the render camera separation is larger than the user's IPD. In fact, one severe issue that can arise includes divergent eye movements which force eye muscles to rotate beyond parallel, leading to severe acute discomfort.

Often a system's render camera separation cannot be sufficiently matched to the user's IPD. This typically happens because eye trackers and eye models are not error-free. In many situations, existing eye tracking systems can be erroneous to 2 millimeters (mm). If an adult's IPD were on the lower end of the average range (e.g., about 54 mm), then a 2 mm error can result in a percentage error of about 3.7%. Such errors can compromise accurate depth estimation, resulting in inaccurate manipulation with and estimation of virtual objects.

Under-matching render camera separation to IPD (i.e. setting the render camera separation to be smaller than the user's IPD) is more beneficial with respect to precise fine motor tasks as compared to over-matching (i.e. setting the render camera separation to be larger than the user's IPD). For example, when a user is performing a task that requires perceptual alignment or perceptual matching, tests have shown that under-matching is preferable to over-matching. In fact, setting the render camera separation to be between about 60%-90% of the user's IPD improves precise depth performance while not compromising the user's visual comfort. However, the impact of a larger render camera separation for far viewing tasks is more about comfort than precision. As such, avoiding render camera separations that are larger than the user's IPD is desirable to maintain proper comfort, even for far viewing distances.

The disclosed embodiments are directed to techniques for optimizing or improving near viewing and precision-based tasks by adjusting the render camera separation based on various factors, including (i) the viewing distance of the virtual environment (which can be measured via vergence angle, measuring virtual distances of the objects from the observer, or using a depth map to estimate virtual distances) and/or (ii) the fixation point of the user. The embodiments also optimize or improve the user's experience with respect to far viewing tasks.

To achieve these benefits, the render camera separation for near distance tasks (at or below about 1 diopter=1 meter (m)) can be beneficially adjusted to 60%-80% of the user's IPD. On the other hand, for far viewing tasks, especially tasks where viewing distance is beyond infinity (e.g., depths beyond about 6 m), the render camera separation can beneficially be adjusted to 90% of the user's IPD to avoid a possibility of divergence beyond parallel eye movements. By performing the disclosed operations, the embodiments are able to significantly improve the user's experience with the ER system. Accordingly, these and numerous other benefits will now be described in more detail throughout the remaining portions of this disclosure.

Example Architecture(s)

Attention will now be directed to FIG. 1, which illustrates an example architecture 100 that can be used to achieve the benefits, advantages, and practical applications mentioned above. Architecture 100 can, for example, be implemented by an ER system 105, which includes an HMD. As used herein, the phrases ER system and HMD can be used interchangeably and generally refer to a type of system that allows a user to see virtualized content in the form of holograms. ER system 105 can be a VR, AR, or MR system.

Architecture 100 is shown as including a service 110, which can also be implemented on the ER system 105. As used herein, the term "service" refers to an automated program that is tasked with performing different actions based on input. In some cases, service 110 can be a deterministic service that operates fully given a set of inputs and without a randomization factor. In other cases, service 110 can be or can include a machine learning (ML) or artificial intelligence engine. The ML engine enables service 110 to operate even when faced with a randomization factor.

As used herein, reference to any type of machine learning or artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In some implementations, service 110 is a cloud service operating in a cloud environment. In some implementations, service 110 is a local service operating on a local device, such as the ER system 105. In some implementations, service 110 is a hybrid service that includes a cloud component operating in the cloud and a local component operating on a local device. These two components can communicate with one another.

Figure 2A:
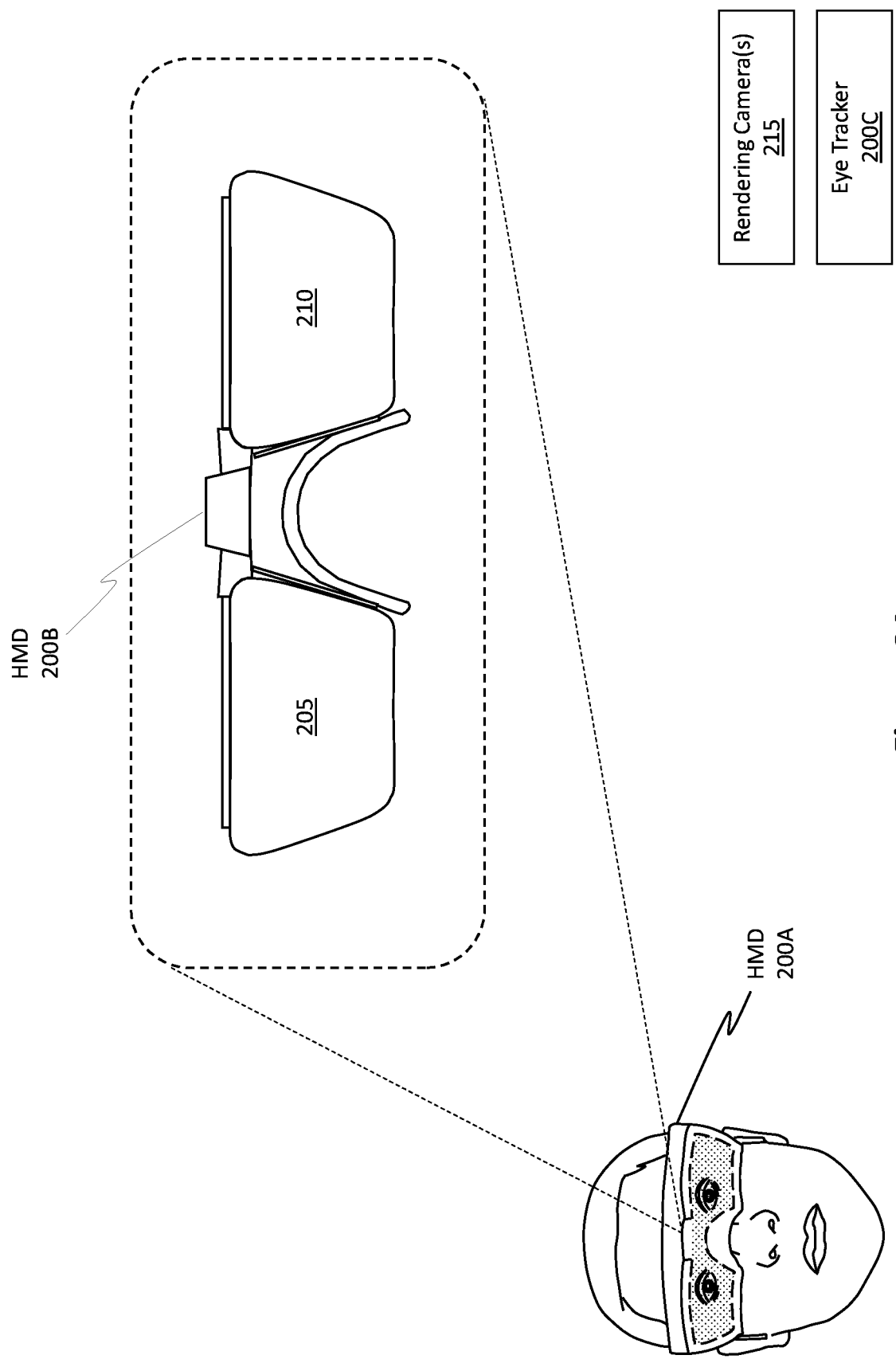
FIG. 2A illustrates an example of an HMD.

Service 110 is generally tasked with adjusting a render camera separation (or "render camera separation distance") that exists between images or stimuli, which are generated by a pair of rendering cameras. This adjustment is performed to accommodate the user's IPD and to improve the user's viewing experience with the ER system 105. Notably, the embodiments reduce the separation distance, resulting in the stimuli being displayed closer to each other (or closer to the HMD's nose bridge or central area of the HMD) as compared to how the stimuli were originally to be displayed. FIG. 2A provides some additional details.

FIG. 2A shows an HMD 200A and HMD 200B, which are representative of the ER system 105 of FIG. 1. HMD 200B includes a lefthand display 205 and a righthand display 210. Each display may be associated with a corresponding rendering camera, as shown by rendering camera(s) 215. The rendering camera(s) 215 render or display content on the displays 205 and 210. HMD 200B can also include one or more eye trackers, as shown by eye tracker 200C.

Figure 2B:
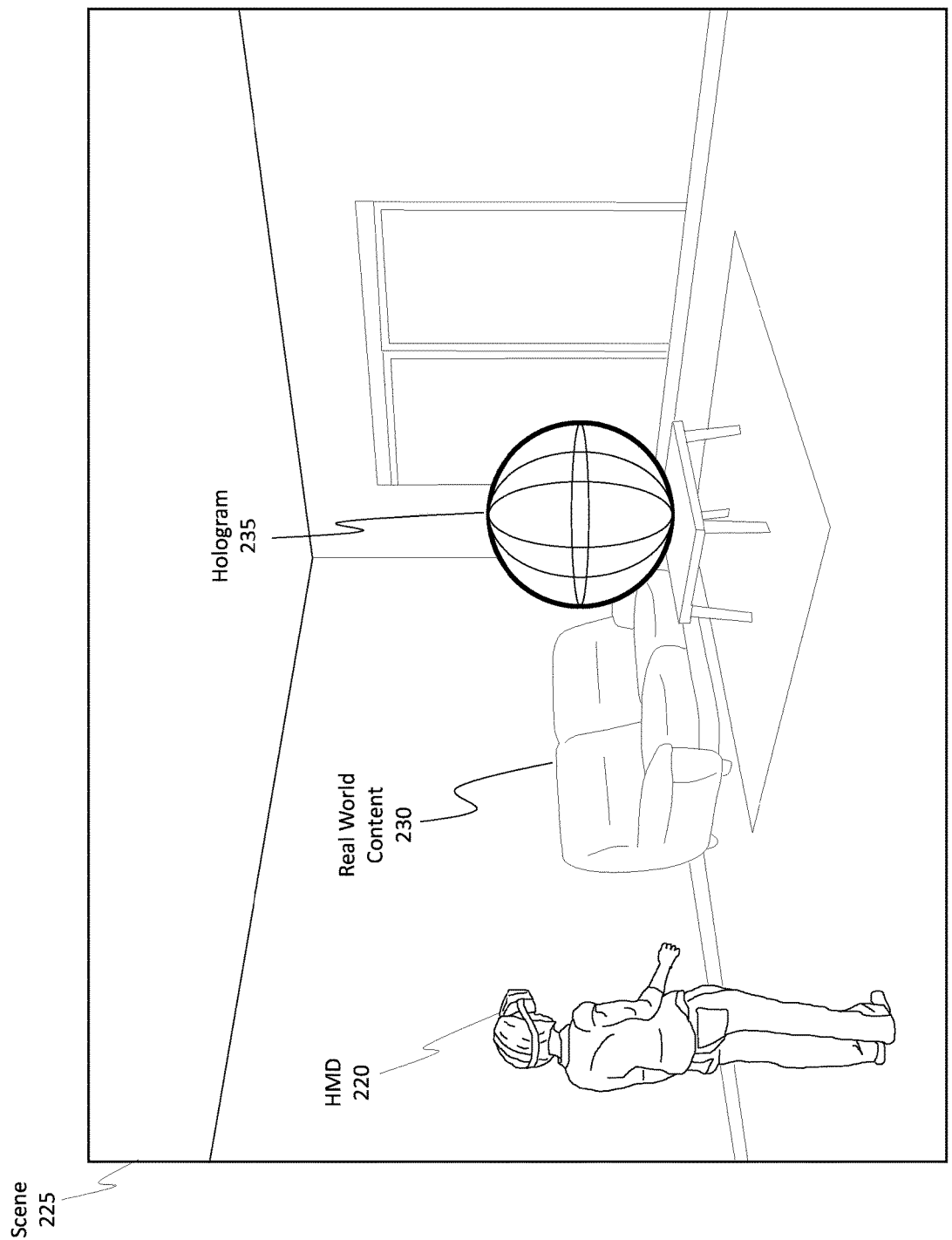
FIG. 2B illustrates an example of a scene rendered by the HMD.

FIG. 2B shows a scenario in which a user is wearing an HMD 220, which corresponds to the HMD 200B of FIG. 2A. HMD 220 is rendering a scene 225 for the user. As used herein, the term "scene" generally refers to any simulated environment (e.g., three-dimensional (3D) or two-dimensional (2D)) that is displayed by an ER system.

Figure 2C:
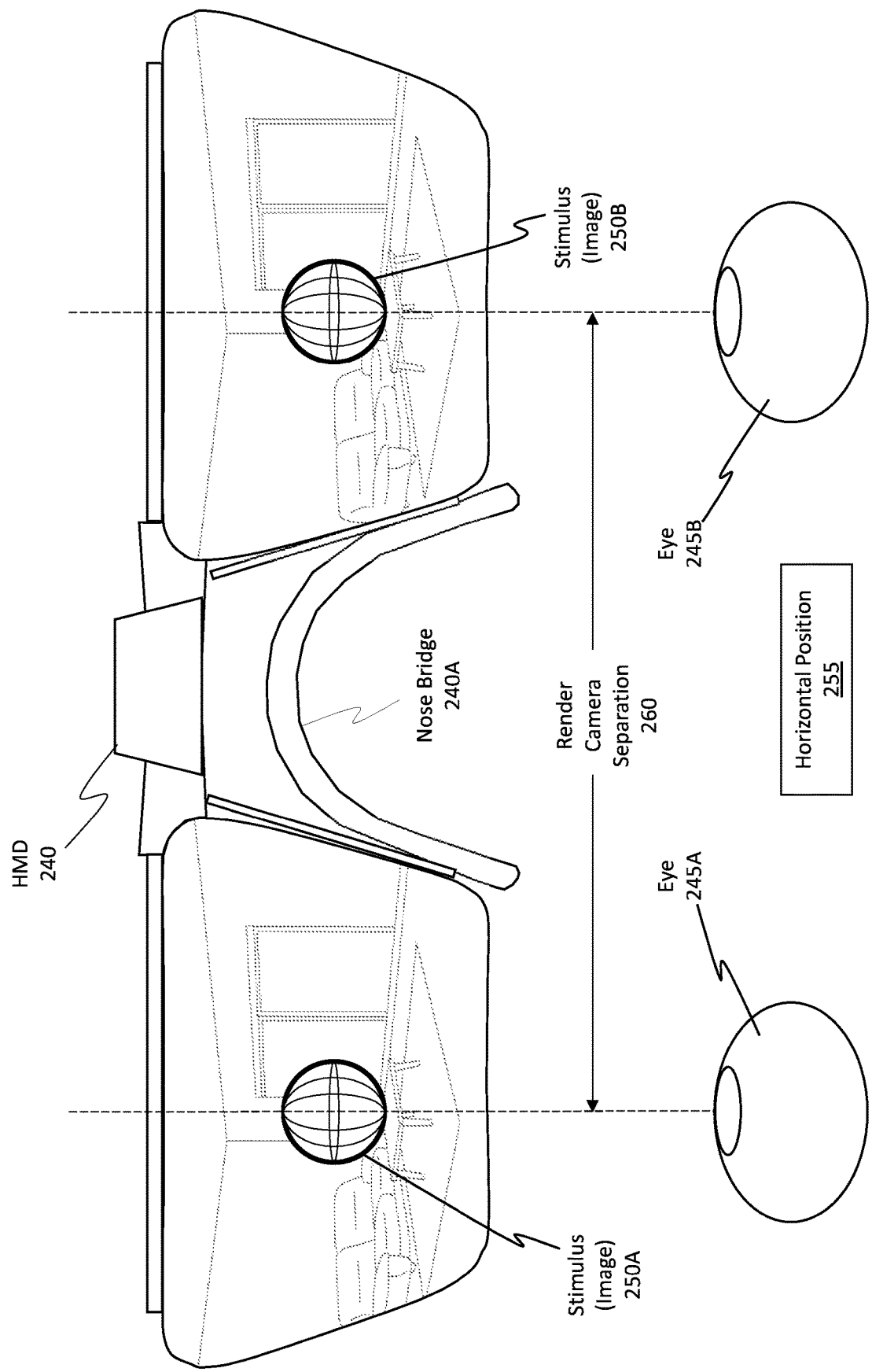
FIG. 2C illustrates a stimulus that is rendered by the HMD.

Scene 225 includes a portion of the real world, as shown by real world content 230. Additionally, scene 225 includes a hologram 235 (aka stimulus). In this particular scenario, the user is able to observe both the real world content 230 and the hologram 235. As a result, HMD 220 is either one of an AR or MR system. In other scenarios, HMD 220 may be a VR system. FIG. 2C provides additional details.

FIG. 2C shows an HMD 240, which corresponds to HMD 220 of FIG. 2B. HMD 240 includes the lefthand display and the righthand display mentioned earlier. HMD 240 can also optionally include a nose bridge 240A, which is the portion of the HMD 240 that rests on the user's nose. In some scenarios, HMD 240 may omit the nose bridge 240A and instead simply have a central area or region of the HMD 240.

The user's left eye 245A will observe content displayed in the lefthand display. The user's right eye 245B will observe content in the righthand display.

In the example shown in FIG. 2C, HMD 240 is rendering or displaying a first version of a stimulus 250A (which can also be referred to more generally as an "image") in the lefthand display. HMD 240 is displaying a second version of the stimulus 250B in the righthand display. Stimulus 250A and 250B correspond to one another in that they represent the same hologram or virtual content. These stimuli might be positioned at different horizontal coordinates of the two displays to enable the user to perceive a depth for the resulting stimulus when the images are fused together in the user's mind. The user's mind will fuse the resulting content together, and that fusion will enable the user to view the stimulus at a particular depth in the scene.

By way of further clarification, HMD 240 displays stimulus 250A at a first horizontal position 255 with respect to the HMD's lefthand display, and HMD 240 displays stimulus 250B at a second horizontal position 255 with respect to the HMD's righthand display. The distance between those two horizontal positions is referred to as the render camera separation 260. Notice, in FIG. 2C, the render camera separation 260 corresponds with the user's IPD. That is, the distance between stimulus 250A and stimulus 250B is currently set to be the same distance as the user's IPD, as shown by the dashed vertical lines in FIG. 2C. Each dashed vertical line passes through the user's pupils and through the stimulus. Notice, stimulus 250A is directly in line with the user's left pupil, and stimulus 250B is directly in line with the user's right pupil, resulting in the render camera separation 260 being the same or substantially the same as the user's IPD.

Figure 3:
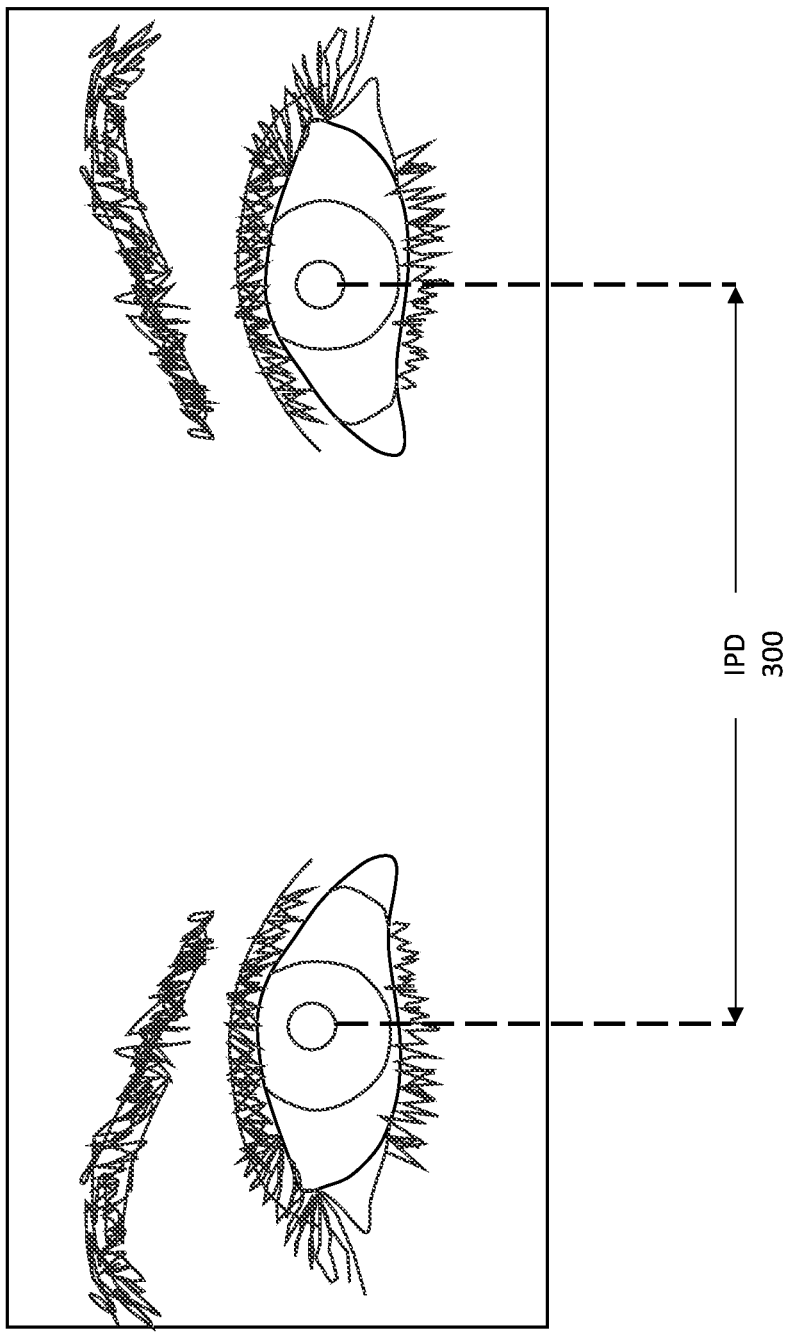
FIG. 3 illustrates an interpupillary distance (IPD) of a user.

Returning To FIG. 1, service 110 receives, as input, an IPD 115 measurement for the user. Turning briefly to FIG. 3, IPD 300 is shown. IPD 300 refers to the distance between the user's two pupils.

In some cases, the IPD 115 in FIG. 1 is determined by the HMD in real time. For instance, the HMD may be equipped with eye trackers (e.g., eye tracker 200C from FIG. 2A) to track the position of the user's eyes. These eye trackers can also determine the distance between the user's pupils.

In other cases, IPD 115 is received as a parameter that is entered or provided by the user. For example, the user may already know his/her IPD, and the user can enter that value as a parameter to the HMD.

In some scenarios, service 110 also determines a focal plane 115A for stimuli rendered by the HMD. The focal plane 115A may be the plane or distance at which a stimulus is being displayed by the HMD's rendering cameras. In some scenarios, service 110 also (or alternatively) determines the user's fixation point 115B, which refers to the area in the scene where the user is directing his/her gaze.

The information about the focal plane 115A and/or the fixation point 115B can be used to determine how to adjust or modify the separation distance between the stimuli. For example, if the stimuli is rendered at a location that is farther from the user than the focal plane 115A, then the embodiments may reduce the render camera separation by approximately 10%, resulting in the final render camera separation being 90% of what it previously was. On the other hand, if the stimuli is rendered at a location that is closer to the user than the focal plane 115A, then the embodiments may reduce the render camera separation by a value between about 20% and 40%, resulting in the final render camera separation being about 60%-80% of what it previously was.

In some cases, if the stimuli is rendered at the focal plane 115A, then no reduction or a reduction between about 1% and about 10% is performed. As the distance between the stimuli and the focal plane increases (resulting in the stimuli being displayed either closer to the user or farther away from the user), then the embodiments can progressively reduce the render camera separation until a maximum reduction (e.g., about 40%) is achieved.

In any event, service 110 uses the IPD 115 and either one or both of the focal plane 115A or the fixation point 115B to modify or adjust the render camera separation 120, which refers to the offset or distance that exists between a first version of a stimulus, as it is presented in the lefthand display of the HMD, and a second version of the stimulus, as it is presented in the righthand display of the HMD. More specifically, service 110 reduces the separation distance between the stimuli. FIGS. 4 and 5A-5D are illustrative.

Figure 4:
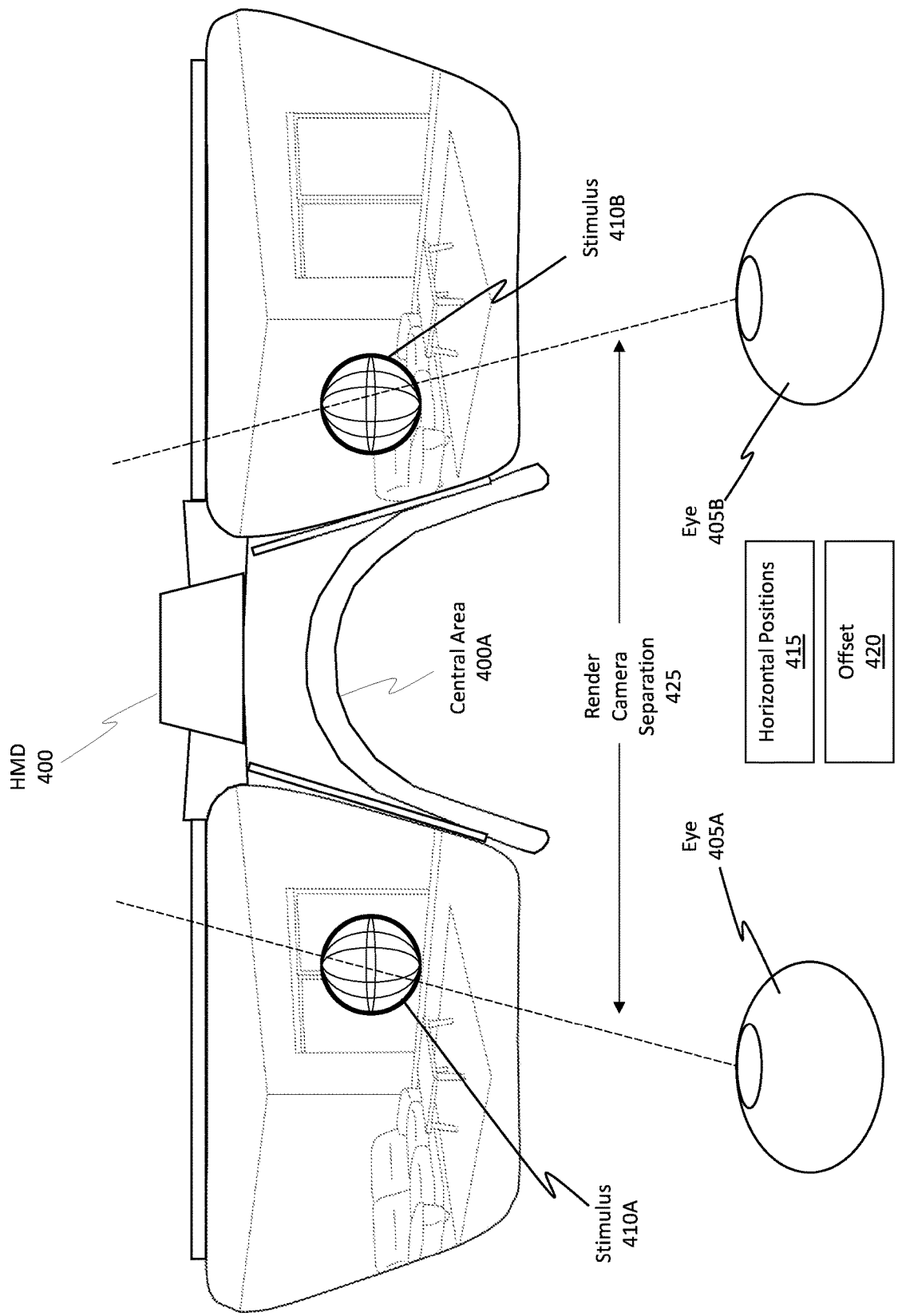
FIG. 4 illustrates a scenario in which the render camera separation is reduced.

FIG. 4 shows an HMD 400 that is representative of the HMDs discussed thus far. HMD 400 includes a central area 400A for its displays, such as the nose bridge mentioned earlier.

The user's left eye 405A observes the stimulus 410A. The user's right eye 405B observes the stimulus 410B. Notice, the horizontal positions 415 of the stimuli 410A and 410B are directed more inwardly toward the central area 400A as compared to the horizontal positions of the stimuli 250A and 250B shown in FIG. 2C. That is, the offset 420 or render camera separation 425 between the stimuli is reduced as compared to the previous render camera separation 260 in FIG. 2C. The embodiments purposefully reduce the render camera separation 425 that exists between the stimulus 410A and stimulus 410B in order to improve the user's experience with the HMD 400, as discussed earlier.

Figure 5A:
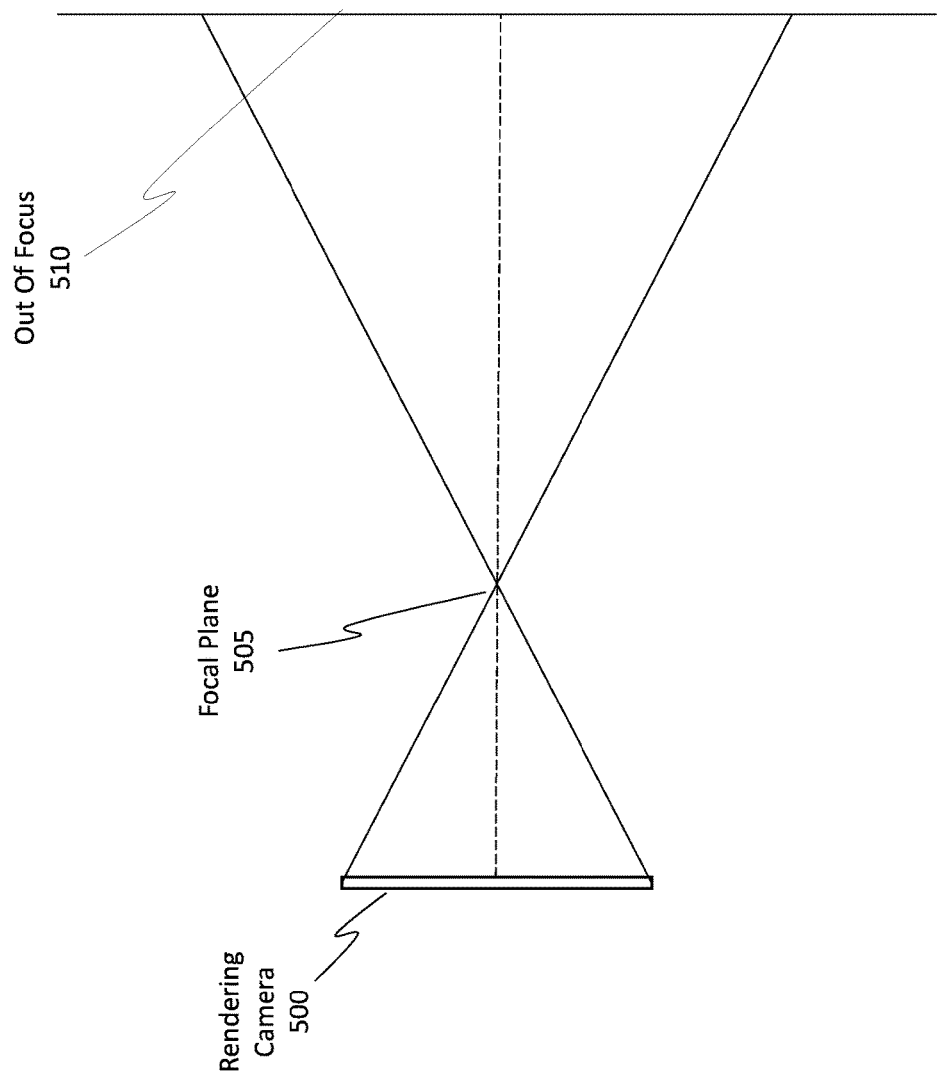
FIGS. 5A, 5B, 5C, and 5D illustrate different rendering positions of a hologram.

FIG. 5A shows a rendering camera 500, which may be any one of the rendering camera(s) 215 from FIG. 2A. The rendering camera 500 is able to display content (e.g., a stimulus) at various coordinates in the display. In the example shown in FIG. 5A, the area of focus, or the focal plane 505, is shown. Content displayed at locations other than the focal plane 505 will not be in focus, as shown by out of focus 510.

Figure 5B:
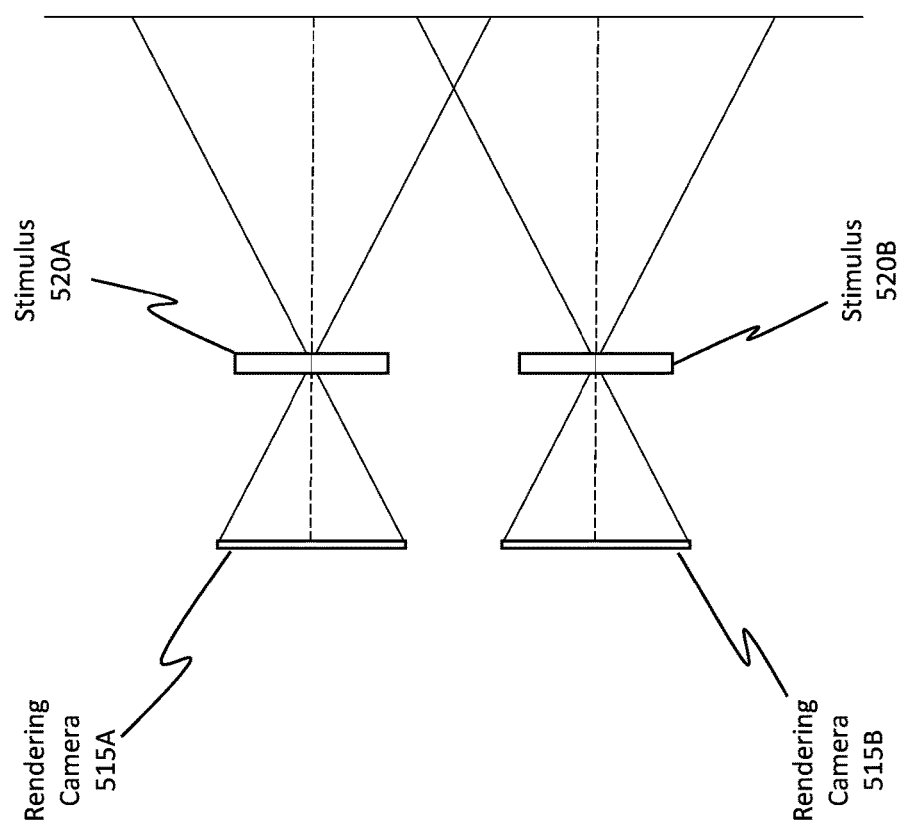

FIG. 5B shows a scenario involving two rendering cameras (e.g., rendering camera 515A and rendering camera 515B). Both cameras are rendering content at a focal plane, as shown by stimulus 520A and stimulus 520B. Rendering camera 515A can be the camera rendering content in the lefthand display 205 of FIG. 2A, and rendering camera 515B can be the camera rendering content in the righthand display 210 of FIG. 2A. Stimulus 520A may correspond to stimulus 250A of FIG. 2C, and stimulus 520B may correspond to stimulus 250B of FIG. 2C. The horizontal dashed lines correspond to the optical axes for the user's pupils. Thus, in FIG. 5B, the stimuli 520A and 520B are displayed in line with the user's pupils. Stated differently, the render camera separation for the cameras rendering the stimuli 520A and 520B are inline with the user's IPD.

Figure 5C:
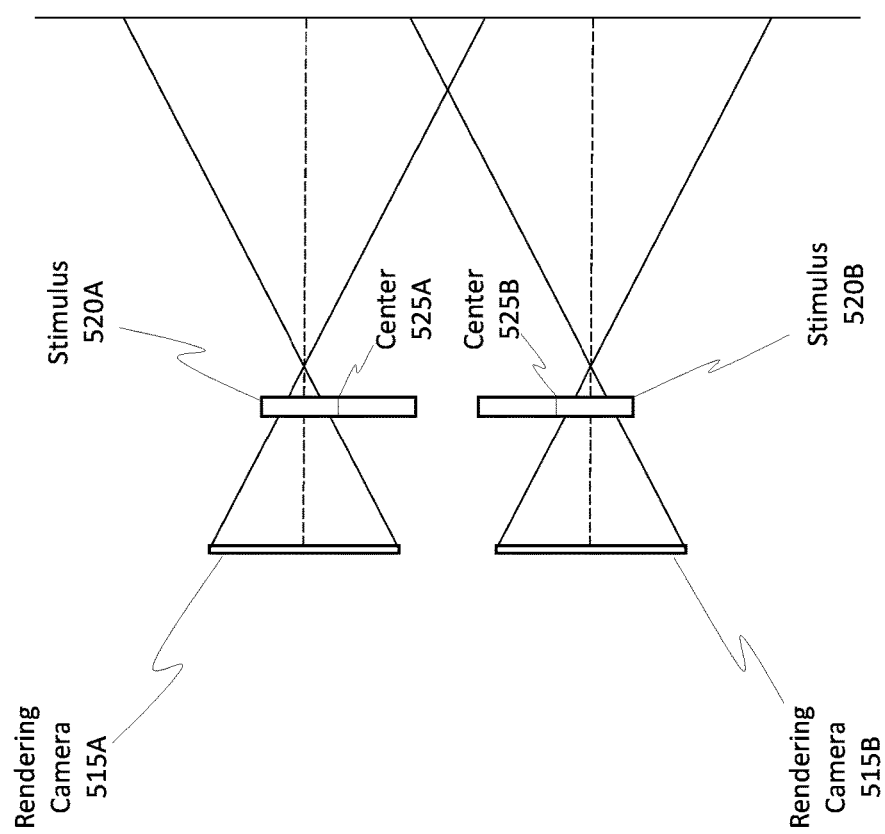

In accordance with the disclosed principles, the embodiments are able to reduce the render camera separation that exists between the stimulus 520A and 520B. FIG. 5C is illustrative.

FIG. 5C shows the rendering cameras 515A and 515B as well as the stimuli 520A and 520B. Each stimulus has a corresponding "center," as shown by the center 525A for stimulus 520A and the center 525B for stimulus 520B.

In FIG. 5B, the centers were aligned with the user's pupils. In FIG. 5C, however, the centers 525A and 525B are now offset relative to the central lines of the rendering cameras. Furthermore, the centers 525A and 525B are now closer to one another (in a horizontal manner) as compared to their previous positions. Using FIG. 4 as a reference, the stimuli 410A and 410B (corresponding to stimuli 520A and 520B, respectively) are now displayed at horizontal positions that are closer to one another and that are closer to the central area 400A, or the nose bridge of the HMD.

Also note, in FIG. 5C, the stimuli 520A and 520B were displayed at depths that were closer than the depth of the focal plane of the rendering cameras. In such a scenario, it is often the case that the embodiments will reduce the render camera separation by 20% to 40%, resulting in the final render camera separation being about 60% to 80% of its original value.

Figure 5D:
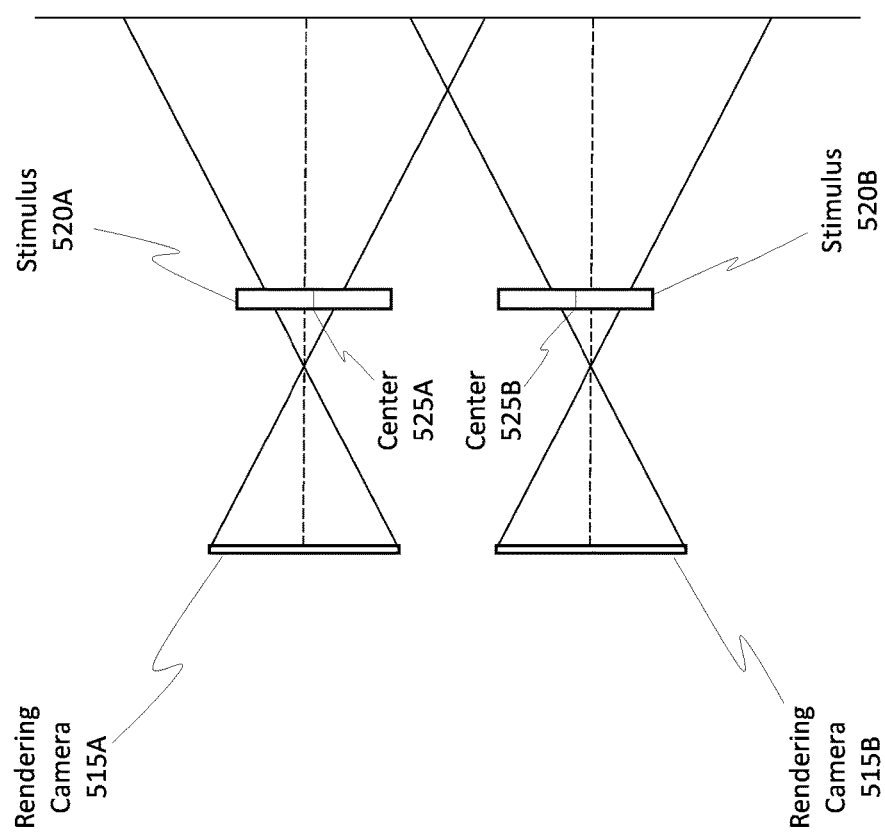

In FIG. 5D, the stimuli 520A and 520B are displayed at depths that are farther than the depth of the focal plane. In such a scenario, it is often the case that the embodiments will reduce the render camera separation by about 10%, resulting in the final render camera separation being about 90% of its original value. Notwithstanding these changes in depth, the centers 525A and 525B are still displayed as being closer to one another as compared to the scenario presented in FIG. 5B.

As mentioned previously, some embodiments use a progressive reduction technique. For instance, as a stimulus's depth more closely approaches the focal plane of the rendering cameras, the amount of reduction may be progressively reduced. For instance, suppose that the stimuli has a depth that is closer to the user than the depth of the focal plane. Initially, the amount of reduction may be set to a 40% reduction.

Now, suppose the depth of the stimulus changes and it approaches the depth of the focal plane. As that change occurs, the amount of reduction can progressively change until it reaches a 20% reduction. As the stimulus's depth approaches the focal plane (from a depth nearer to the user than the depth of the focal plane), the reduction in render camera separation can progressively change between a range of 40% and 20%. Once the depth of the stimulus reaches or exceeds the depth of the focal plane, the amount of reduction may then be set to a constant reduction of about 10%. Thus, some embodiments employ a linear percentage reduction in the render camera separation until a threshold depth (e.g., the depth of the focal plane) is reached. Once that threshold depth is reached, the reduction curve may plateau to a constant reduction of about 10%, or some other selected percentage (e.g., any value between about 1% and about 10%). In some cases, the constant reduction can be set to a value between 1% and 20%. In some cases, if a threshold depth is reached for the stimulus (e.g., approaching infinity, or any depth over about 6 m), then a lower reduction value may be used, such as a reduction value between about 1% and about 5%.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
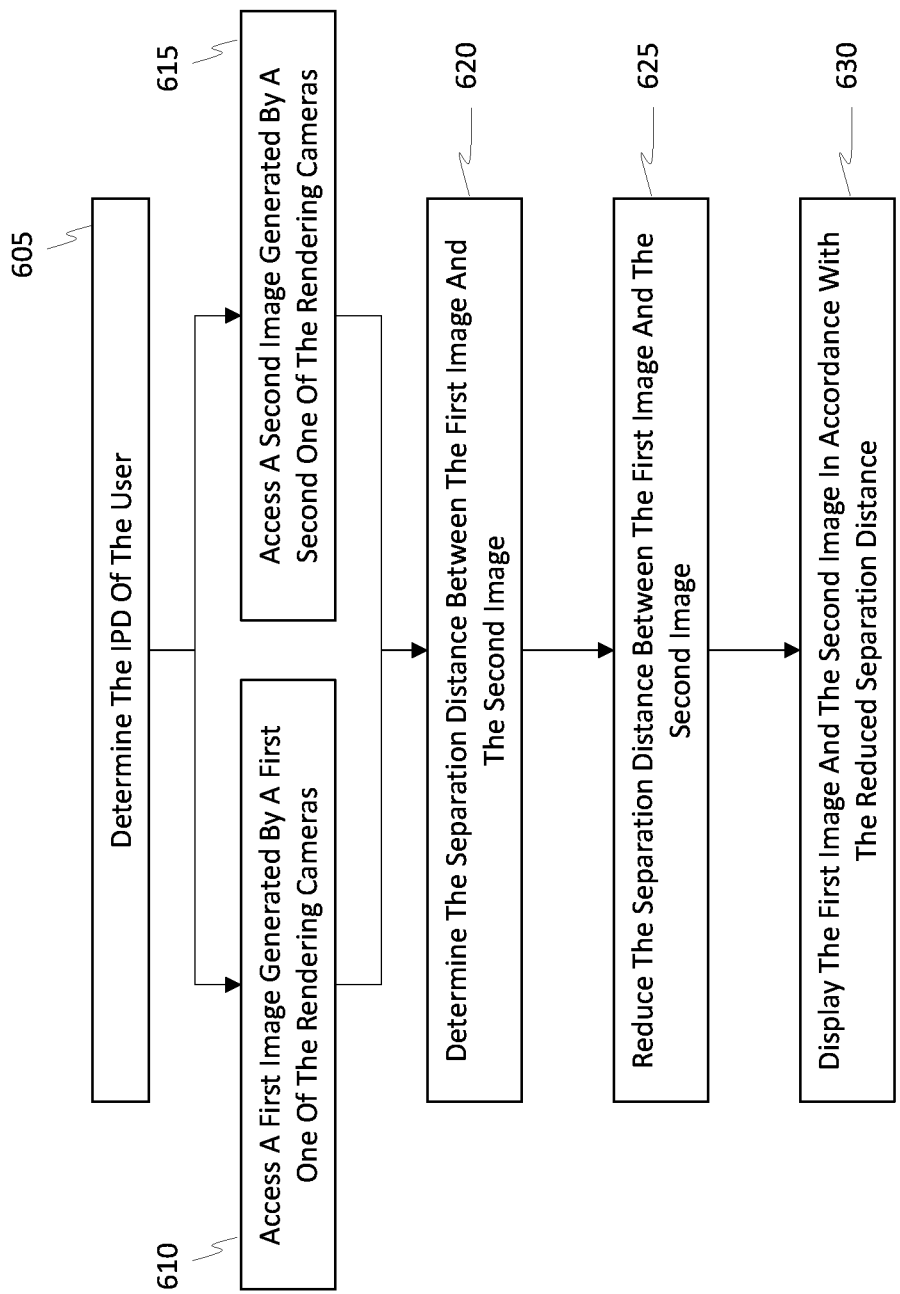
FIGS. 6 and 7 illustrate flowcharts of example methods for modifying a render camera separation.

Attention will now be directed to FIG. 6, which illustrates a flowchart of an example method 600 that adjusts a separation distance (aka render camera separation) between images generated by a pair of rendering cameras to accommodate an interpupillary distance (IPD) of a user who is viewing the images. Method 600 can be implemented using the architecture 100 of FIG. 1. For instance, method 600 can be performed by the ER system 105. More specifically, method 600 can be implemented by the service 110.

Method 600 includes an act (act 605) of determining the IPD of the user. In some scenarios, the user's IPD is received as user input entered by the user. In some scenarios, the user's IPD is determined via an eye tracker of the computer system.

Act 610 involves accessing a first image (or first stimulus) generated by a first one of the rendering cameras.

In parallel, in serial, or asynchronously with act 610, act 615 includes accessing a second image (or second stimulus) generated by a second one of the rendering cameras.

Act 620 includes determining the separation distance between the first image and the second image. The separation distance initially corresponds with the user's IPD. As one example, the separation distance (e.g., prior to any reduction) may be a value within a range spanning between about 48 millimeters (mm) and 73 mm.

Act 625 includes reducing the separation distance between the first image and the second image, resulting in the separation distance being narrower than the user's IPD. In one example, the separation distance is reduced by at least 10%. In another example, the separation distance is reduced by 10-40%. In yet another example, the separation distance is reduced by at least 5 millimeters (mm). In some cases, the separation distance is reduced by at least 7 mm. In some cases, the separation distance is reduced by 5-30 mm. Some embodiments employ the linear adjustment scheme for depths that are smaller than the focal plane and then a constant adjustment scheme for depths that are the same or greater than the focal plane.

In some cases, reducing the separation distance is based on a viewing distance of a scene rendered by the computer system. Reducing the separation distance may be based on a fixation point of the user with respect to the scene. In some scenarios, reducing the separation distance may be based on focal planes of one or both of the first and second rendering cameras. In some scenarios, reducing the separation distance is based on a viewing distance of the first stimulus and the second stimulus.

Act 630 includes displaying the first image and the second image in accordance with the reduced separation distance. Now, the resulting images are displayed in a manner so as to avoid a scenario where the user's eyes may diverge outwardly. The defined reduction ranges are designed to accommodate errors that may occur when the user's IPD is determined.

Method 600 may further include an act of determining that the first stimulus and the second stimulus are displayed as having depths that are less than a distance of a focal plane of the first or second cameras. Another act may then involve reducing the separation distance by a value that is greater than 10%, such as by values that are between about 10% and about 40%. Often, the reduction is between about 20% and about 40%.

Method 600 may further include an act of determining that the first stimulus and the second stimulus are displayed as having depths that are more than a distance of a focal plane of the first or second cameras. Another act may then involve reducing the separation distance by a value that is equal to 10%. Often, the reduction is set to a constant value, such as 10% for any depth that exceeds the focal plane's depth.

Figure 7:
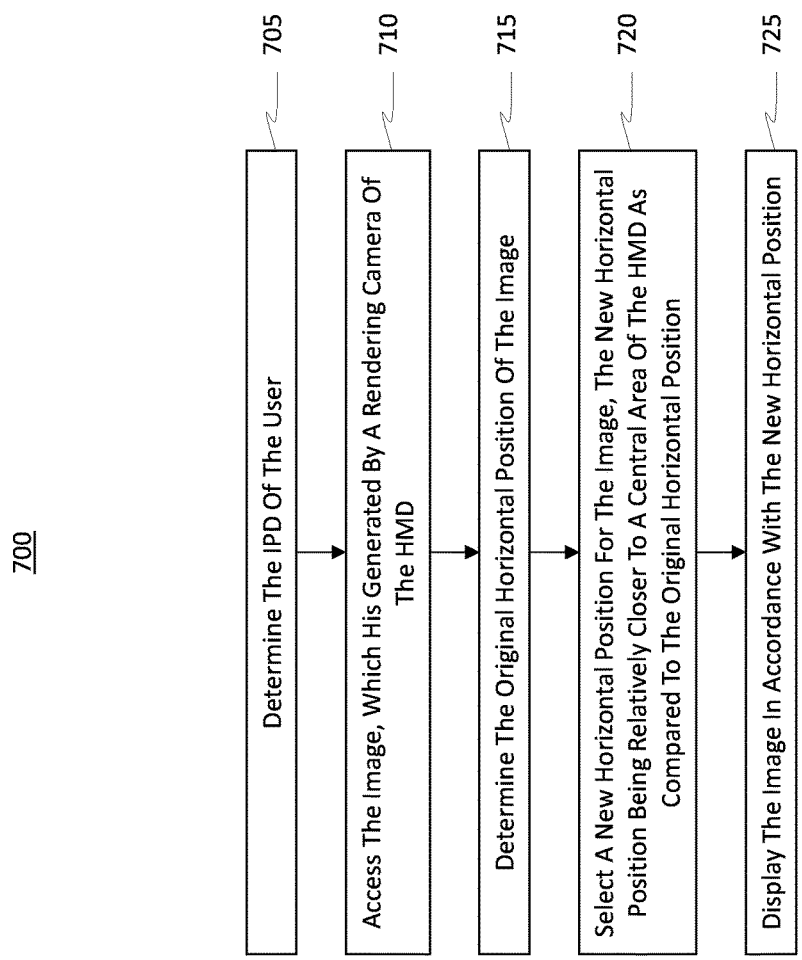

FIG. 7 shows another example method 700 that can be implemented by service 110 of FIG. 1. Method 700 involves acts for adjusting an original horizontal position of an image that is rendered in a display of a head-mounted device (HMD) to accommodate an interpupillary distance (IPD) of a user who is viewing the image and who is wearing the HMD.

Act 705 includes determining the IPD of the user. Any technique mentioned earlier can be used.

Act 710 includes accessing the image. This image is generated by a rendering camera of the HMD.

Act 715 includes determining the original horizontal position of the image as it is to be displayed in the HMD's display. The original horizontal position, or horizontal coordinate, initially corresponds with the user's IPD.

Act 720 includes selecting a new horizontal position for the image. Notably, the new horizontal position is relatively closer to a nose bridge or central area of the HMD as compared to the original horizontal position. Stated differently, the new horizontal position is relatively closer to a central area of the HMD or of the HMD's display. In some cases, an offset or difference between the new horizontal position and the original horizontal position is between about 2.5 millimeters (mm) and about 15 mm. Thus, in some scenarios, each version of the stimuli is brought inwardly by half the above amount (e.g., about 1.25 mm to about 7.5 mm). In some scenarios, the overall reduction is more, such as between about 2.5 mm and about 30 mm, resulting in each stimuli being horizontally offset by about 1.25 mm to about 15 mm.

Act 725 then includes displaying the image in accordance with the new horizontal position. By performing the disclosed operations, the embodiments are able to significantly improve the user's experience with the ER system. Now, high precision content displayed by the ER system can be better viewed and interacted with by the user.

Example Computer/Computer Systems

Figure 8:
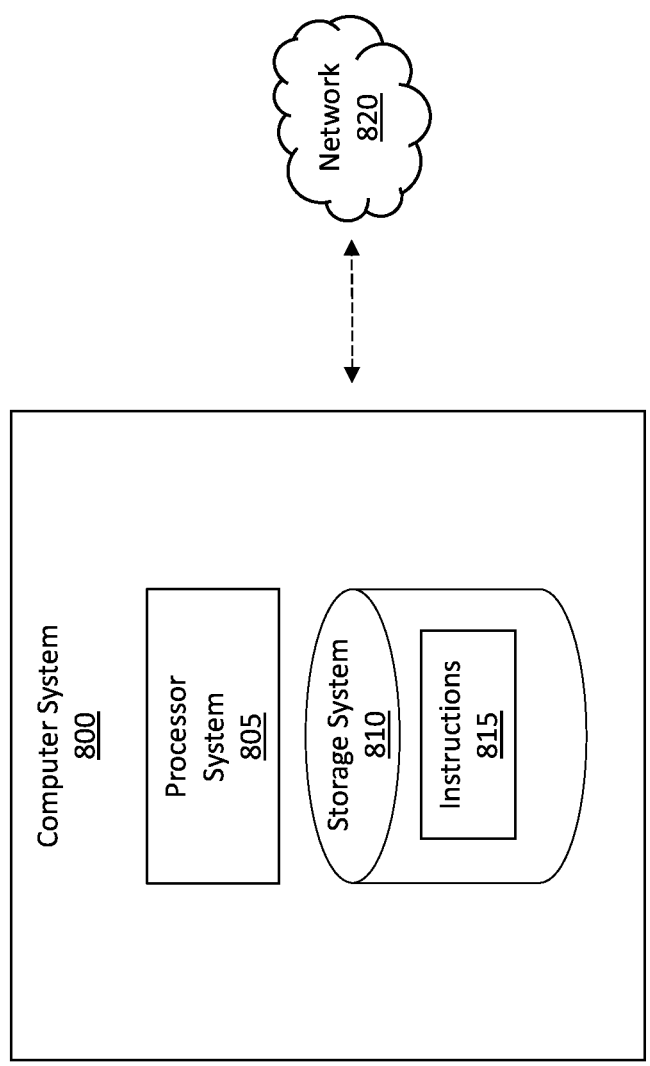
FIG. 8 illustrates an example computer system that can be configured to perform any of the disclosed operations.

Attention will now be directed to FIG. 8 which illustrates an example computer system 800 that may include and/or be used to perform any of the operations described herein. Computer system 800 may take various different forms. For example, computer system 800 may be embodied as a tablet, a desktop, a laptop, a mobile device, or a standalone device, such as those described throughout this disclosure. Computer system 800 may also be a distributed system that includes one or more connected computing components/devices that are in communication with computer system 800. Computer system 800 can be implemented as the ER system 105 of FIG. 1. In some cases, computer system 800 can also implement service 110.

In its most basic configuration, computer system 800 includes various different components. FIG. 8 shows that computer system 800 includes a processor system 805 that includes one or more processor(s) (aka a "hardware processing unit") and a storage system 810.

Regarding the processor(s) of the processor system 805, it will be appreciated that the functionality described herein can be performed, at least in part, by one or more hardware logic components. For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "service," or "engine" can refer to hardware processing units or to software objects, routines, or methods that may be executed on computer system 800. The different components, modules, engines, and services described herein may be implemented as objects or processors that execute on computer system 800 (e.g. as separate threads).

Storage system 810 may include physical system memory, which may be volatile, non-volatile, or some combination of the two. The term "memory" may also be used herein to refer to non-volatile mass storage such as physical storage media. If computer system 800 is distributed, the processing, memory, and/or storage capability may be distributed as well.

Storage system 810 is shown as including executable instructions 815. The executable instructions 815 represent instructions that are executable by the processor(s) of processor system 805 to perform the disclosed operations, such as those described in the various methods.

The disclosed embodiments may comprise or utilize a special-purpose or general-purpose computer including computer hardware, such as, for example, one or more processors and system memory, as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 800 may also be connected (via a wired or wireless connection) to external sensors (e.g., one or more remote cameras) or devices via a network 820. For example, computer system 800 can communicate with any number devices or cloud services to obtain or process data. In some cases, network 820 may itself be a cloud network. Furthermore, computer system 800 may also be connected through one or more wired or wireless networks to remote/separate computer systems(s) that are configured to perform any of the processing described with regard to computer system 800.

A "network," like network 820, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 800 will include one or more communication channels that are used to communicate with the network 820. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Clauses

Clause 1. A computer system that adjusts a separation distance between images generated by a pair of rendering cameras to accommodate an interpupillary distance (IPD) of a user who is viewing the images, said computer system comprising: a processor system; and a storage system that stores instructions that are executable by the processor system to cause the computer system to: determine the IPD of the user; access a first image generated by a first one of the rendering cameras; access a second image generated by a second one of the rendering cameras; determine the separation distance between the first image and the second image, wherein the separation distance initially corresponds with the user's IPD; reduce the separation distance between the first image and the second image, resulting in the separation distance being narrower than the user's IPD; and display the first image and the second image in accordance with the reduced separation distance.

Clause 2. The computer system of clause 1, wherein the user's IPD is received as user input.

Clause 3. The computer system of clause 1, wherein the user's IPD is determined via an eye tracker of the computer system.

Clause 4. The computer system of clause 1, wherein the separation distance, prior to reduction, is a value within a range spanning between about 48 millimeters (mm) and 73 mm.

Clause 5. The computer system of clause 1, wherein the separation distance is reduced by at least 10%.

Clause 6. The computer system of clause 1, wherein the separation distance is reduced by 10-40%.

Clause 7. The computer system of clause 1, wherein reducing the separation distance is based on a viewing distance of a scene rendered by the computer system.

Clause 8. The computer system of clause 1, wherein reducing the separation distance is based on a focal plane of one or both of the first and second rendering cameras.

Clause 9. The computer system of clause 1, wherein reducing the separation distance is based on a fixation point of the user with respect to a scene rendered by the computer system.

Clause 10. The computer system of clause 1, wherein the separation distance is reduced by at least 5 millimeters.

Clause 11. A method for adjusting a render camera separation between stimuli generated by a pair of rendering cameras to accommodate an interpupillary distance (IPD) of a user who is viewing the stimuli, said method comprising: determining the IPD of the user; accessing a first stimulus generated by a first one of the rendering cameras; accessing a second stimulus generated by a second one of the rendering cameras; determining the render camera separation between the first stimulus and the second stimulus, wherein the render camera separation initially corresponds with the user's IPD; reducing the render camera separation between the first stimulus and the second stimulus, resulting in the render camera separation being narrower than the user's IPD; and displaying the first stimulus and the second stimulus in accordance with the reduced render camera separation.

Clause 12. The method of clause 11, wherein the render camera separation is reduced by at least 7 millimeters.

Clause 13. The method of clause 11, wherein reducing the render camera separation is based on a viewing distance of the first stimulus and the second stimulus.

Clause 14. The method of clause 11, wherein reducing the render camera separation is based on a focal plane of the first rendering camera.

Clause 15. The method of clause 11, wherein reducing the render camera separation is based on a focal plane of the second rendering camera.

Clause 16. The method of clause 11, wherein the render camera separation is reduced by 5-30 millimeters.

Clause 17. The method of clause 11, wherein the method further includes: determining that the first stimulus and the second stimulus are displayed as having depths that are less than a depth of a focal plane of the first or second cameras; and reducing the render camera separation by a value that is greater than 10%.

Clause 18. The method of clause 11, wherein the method further includes: determining that the first stimulus and the second stimulus are displayed as having depths that are more than a depth of a focal plane of the first or second cameras; and reducing the render camera separation by a value that is equal to 10%.

Clause 19. A method for adjusting an original horizontal position of an image that is rendered in a display of a head-mounted device (HMD) to accommodate an interpupillary distance (IPD) of a user who is viewing the image and who is wearing the HMD, said method comprising: determining the IPD of the user; accessing the image, which his generated by a rendering camera of the HMD; determining the original horizontal position of the image, wherein the original horizontal position initially corresponds with the user's IPD; selecting a new horizontal position for the image, the new horizontal position being relatively closer to a central area of the HMD as compared to the original horizontal position; and displaying the image in accordance with the new horizontal position.

Clause 20. The method of clause 18, wherein an offset between the new horizontal position and the original horizontal position is between about 2.5 millimeters (mm) and about 15 mm.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system that adjusts a separation distance between images generated by a pair of rendering cameras to accommodate an interpupillary distance (IPD) of a user who is viewing the images, said computer system comprising:
    a processor system; and
    a storage system that stores instructions that are executable by the processor system to cause the computer system to:
        determine an IPD measurement for the user;
        access a first image generated by a first one of the rendering cameras;
        access a second image generated by a second one of the rendering cameras;
        determine the separation distance between the first image and the second image, wherein the separation distance is initially set to be the IPD measurement;
        determine that an error in the IPD measurement will potentially compromise a depth visualization provided by the computer system, wherein said potential compromise involves pupils of the user diverging beyond parallel;
        perform an under-matching operation to avoid said potential compromise by reducing the separation distance between the first image and the second image, resulting in the separation distance being narrower than the IPD measurement, wherein said reducing is dynamically based on a real-time vergence angle of the user or a real-time fixation point of the user, a determined by an eye-tracking system, to optimize rendering for near or far viewing distances; and
        display the first image and the second image in accordance with the reduced separation distance.

2. The computer system of claim 1, wherein the IPD measurement is received as user input.

3. The computer system of claim 1, wherein the IPD measurement is determined via an eye tracker of the computer system.

4. The computer system of claim 1, wherein the separation distance, prior to reduction, is a value within a range spanning between about 48 millimeters (mm) and 73 mm.

5. The computer system of claim 1, wherein the separation distance is reduced by 10-40%.

6. The computer system of claim 1, wherein reducing the separation distance is based on a viewing distance of a scene rendered by the computer system.

7. The computer system of claim 1, wherein reducing the separation distance is based on a focal plane of one or both of the first and second rendering cameras.

8. The computer system of claim 1, wherein reducing the separation distance is based on the real-time fixation point of the user with respect to a scene rendered by the computer system.

9. The computer system of claim 1, wherein the separation distance is reduced by at least 5 millimeters.

10. A method for adjusting a render camera separation between stimuli generated by a pair of rendering cameras to accommodate an interpupillary distance (IPD) of a user who is viewing the stimuli, said method comprising:
- determining an IPD measurement of the user, the IPD measurement being a distance between pupils of the user;
- accessing a first stimulus generated by a first one of the rendering cameras;
- accessing a second stimulus generated by a second one of the rendering cameras;
- determining the render camera separation between the first stimulus and the second stimulus, wherein the render camera separation is initially set to be the the IPD measurment of the user;
- determining that an error in the IPD measurement will potentially compromise a depth visualization, wherein said potential compromise involves the user's pupils divergin beyond parallel;
- performing an under-matching operation to avoid said potential compromise by reducing the render camera separation between the first stimulus and the second stimulus by at least 10%, resulting in the render camera separation being narrower than the IPD measurement of the user by at least 10%, wherein reducing the separation distance by at least 10% facilitates performance of both (i) precision-based near field tasks and (ii) far field tasks; and
- displaying the first stimulus and the second stimulus in accordance with the reduced render camera separation.

11. The method of claim 10, wherein the render camera separation is reduced by at least 7 millimeters.

12. The method of claim 10, wherein reducing the render camera separation is based on a viewing distance of the first stimulus and the second stimulus.

13. The method of claim 10, wherein reducing the render camera separation is based on a focal plane of the first rendering camera.

14. The method of claim 10, wherein reducing the render camera separation is based on a focal plane of the second rendering camera.

15. The method of claim 10, wherein the render camera separation is reduced by 5-30 millimeters.

16. The method of claim 10, wherein the method further includes:
- determining that the first stimulus and the second stimulus are displayed as having depths that are less than a depth of a focal plane of the first or second cameras; and
- reducing the render camera separation by a value that is greater than 10%.

17. The method of claim 10, wherein the method further includes:
- determining that the first stimulus and the second stimulus are displayed as having depths that are more than a depth of a focal plane of the first or second cameras; and
- reducing the render camera separation by a value that is equal to 10%.

* * * * *